United States Patent [19]
Maca

[11] 3,728,830
[45] Apr. 24, 1973

[54] PROCESS OF PRODUCING DAY/NIGHT MIRRORS

[75] Inventor: Paul D. Maca, Western Springs, Ill.

[73] Assignee: Sommer Maca Glass Machinery Company, Chicago, Ill.

[22] Filed: Sept. 13, 1971

[21] Appl. No.: 179,926

[52] U.S. Cl. ................................................51/283
[51] Int. Cl. ...............................................B24b 1/00
[58] Field of Search......................51/283, 323, 281, 51/5; 350/281, 178, 286, 320

[56] References Cited

UNITED STATES PATENTS

| | | |
|---|---|---|
| 3,158,971 | 12/1964 | Best..........................................51/283 |
| 3,187,467 | 6/1965 | Cortesi...............................51/283 X |
| 2,836,018 | 5/1958 | Key..........................................51/5 X |
| 2,631,498 | 3/1953 | Barkley..............................350/281 |
| 3,402,004 | 9/1968 | Warhol...............................350/281 |

*Primary Examiner*—Donald G. Kelly
*Attorney*—Howard T. Markey et al.

[57] ABSTRACT

A method of manufacturing mirrors for use in automotive day/night mirror assemblies. A wide bevel is formed along one edge of a sheet of mirror stock. The beveled portion is cut from the mirror stock and another bevel is formed on the mirror stock along the cut edge. These steps are repeated until the entire usable portion of the sheet of mirror stock is cut into beveled strips. The mirrors are pattern or shape cut from the beveled strips.

6 Claims, 4 Drawing Figures

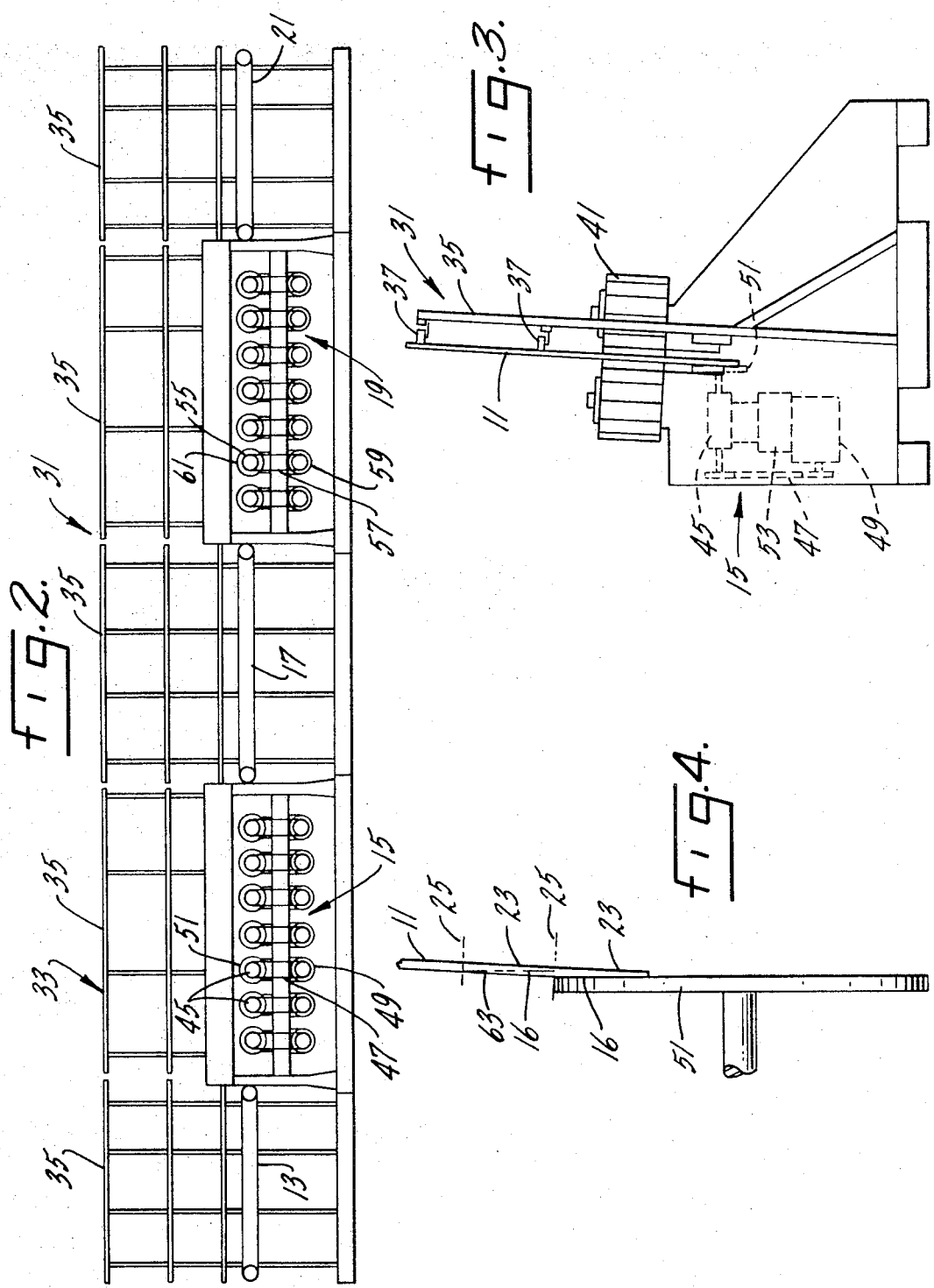

3,728,830

PROCESS OF PRODUCING DAY/NIGHT MIRRORS

SUMMARY OF THE INVENTION

This invention is directed to a method of manufacturing wedge shaped or beveled mirrors for use in automotive day/night mirror assemblies. It is primarily concerned with a method of rapidly making such mirrors by forming a wide bevel in a sheet of mirror stock, cutting a strip from the sheet of mirror stock containing the wide bevel and pattern or shape cutting the mirrors from the strip of beveled mirror stock.

An object of this invention is to rapidly and inexpensively form wedge mirrors for use in automotive day/night mirror assemblies.

Another object is to eliminate the need for separately forming the inclined face or wedge surface of each day/night mirror.

Another object is to increase the uniformity of day/night automotive mirrors.

Other objects may be found in the following specification, claims and drawings.

BRIEF DESCRIPTION OF THE DRAWINGS

The invention is illustrated more or less diagrammatically in the following drawings wherein:

FIG. 2 is a front elevational view of a grinding, lapping, polishing and conveying machine used in the practice of the method of this invention;

FIG. 3 is an enlarged end elevational view of the machine of FIG. 2; and

FIG. 4 is an enlarged partial view showing the formation of a bevel on a sheet of mirror stock.

DESCRIPTION OF THE PREFERRED EMBODIMENT

Figure 1:
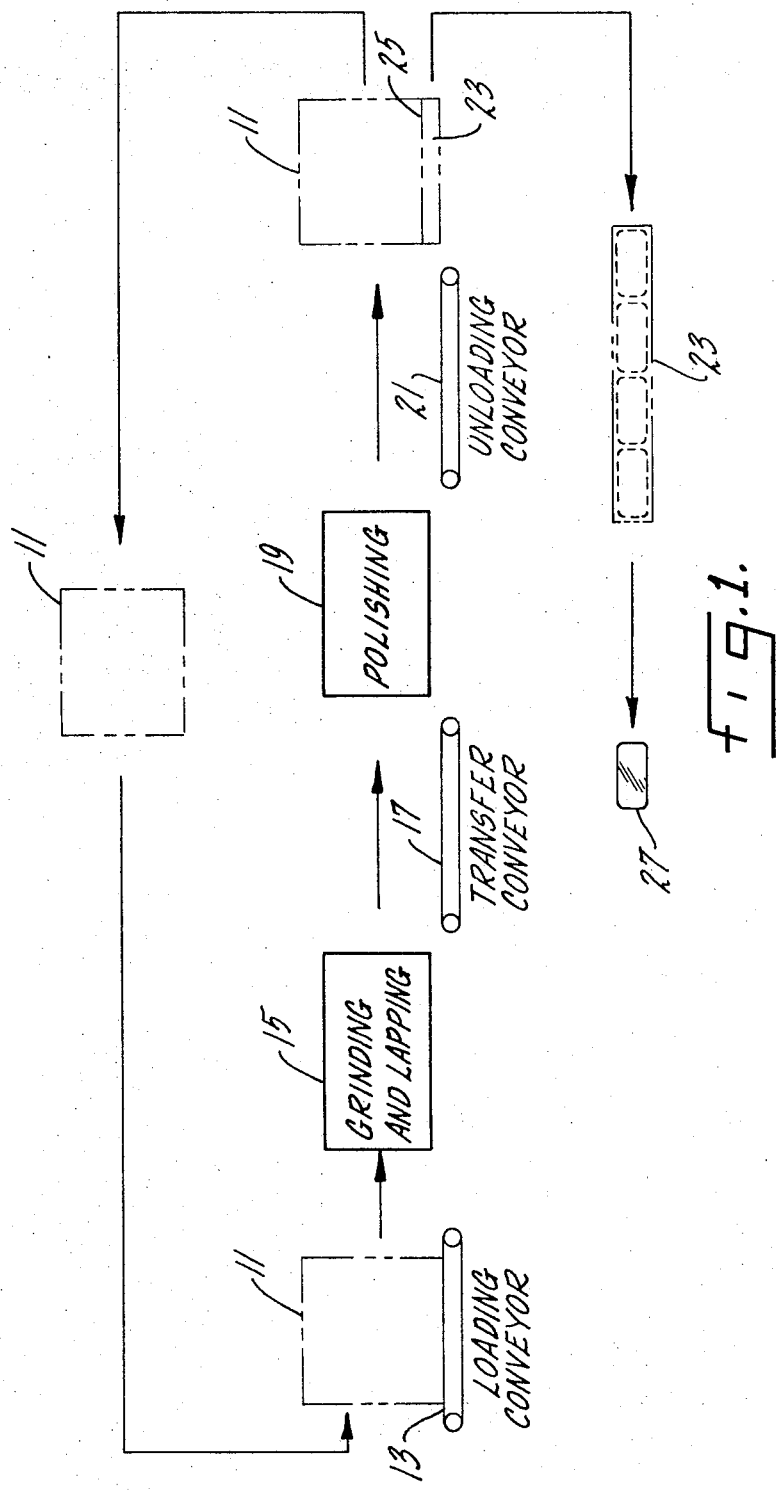
FIG. 1 is a schematic showing the steps of the method of this invention.

FIG. 1 is a schematic or flow diagram showing the steps of the method of this invention. A sheet of mirror stock 11 is placed on a loading conveyor 13 and moved past a bank of grinding and lapping wheels 15. The grinding and lapping wheels cut a bevel on the bottom edge of the sheet 11 in the manner shown in FIG. 4. In this example, the bevel 16 is formed with a width of three inches and at an angle of 3° relative to the face of the sheet. It should be understood that although these dimensions have been found to be particularly suitable for the manufacture of automotive day/night mirrors, the invention should not be limited to the use of this width and angle. Both the width of the mirror and the bevel angle may be varied in the practice of the method of this invention.

The sheet of mirror stock is then moved to a transfer conveyor 17 which moves the beveled portion 16 of the sheet past a bank of polishing wheels 19. The sheet of mirror stock is then moved to an unloading conveyor 21.

The sheet 11 of mirror stock is removed from the unloading conveyor 21 and the strip 23 which includes the beveled portion 16 or at least a major portion thereof, is cut from the sheet along line 25. The shortened sheet of mirror stock is then returned to the loader conveyor 13 for a repeat of the above operations. These steps are repeated until all of the usable portion of the mirror stock is cut into beveled strips. The usable portion of each piece of mirror stock will vary depending upon the width of the bevel, the width of the strips cut from the sheet of mirror stock, the initial width of the sheet of mirror stock and the clamping requirements of the machines adapted to practice the method of this invention.

The strips 23 of beveled mirror stock are pattern or shape cut into individual mirrors 27 which are then ready for assembly into automotive mirror assemblies. As can be seen in FIG. 1, the finished mirror 27 will be slightly smaller in width than the strip 23. It is anticipated that a quarter of an inch of mirror stock on each side of the beveled strip will not be usable for the mirrors. However, this may vary in accordance with the size of mirrors produced and it is conceivable that the entire width of the beveled strips 23 may be usable under particular circumstances.

A machine useful in practicing the method of this invention is shown in FIGS. 2 and 3 of the drawings. It should be understood that the method of this invention is not limited to the use of any particular machinery and the machinery described herein is offered by way of example only, although it is well suited for the task. This machine, which is generally designated as 31, includes the loading conveyor 13, the bank 15 of grinding and lapping wheels, the transfer conveyor 17, the bank 19 of polishing wheels and the unloading conveyor 21. It also includes a glass supporting framework 33 divided into sections 35. Rollers 37 which engage the sheets 11 of mirror stock are mounted on the framework sections 35. The framework sections are titled slightly from the vertical in the manner shown in FIG. 3 so that the rollers 37 will engage and support the sheets 11. A twin chain pad conveyor 41 clamps and moves the sheet 11 of mirror stock through the bank 15 of grinding and lapping wheels. A chain pad conveyor of this type is described and illustrated in U.S. Pat. no. 2,754,956. A similar pad conveyor clamps and transports the sheet 11 of mirror material through the bank 19 of polishing wheels. The pad conveyors provide a firm fixed moving surface for the sheet 11 of mirror stock so that the bevel 16 applied to the face of the sheet will be accurate and uniform.

The grinding, lapping bank 15 includes spindles 45 each individually connected by a V-belt 47 to an electric motor 49. Each spindle is equipped with a diamond or stone wheel 51. The wheels are arranged on the spindles in decreasing degree of coarseness beginning with a course diamond grit for the wheel which first engages the sheet of mirror stock to a fine grit stone for the wheel which is the last to engage the mirror stock. The number of grinding and lapping spindles can, of course, be varied from the number shown in the drawings as dictated by the requirements for the finished product. The spindles are firmly mounted on a fixed base 53 accurately machined to the bevel angle with respect to the surface of the sheet 11 of mirror stock.

The bank 19 of polishing wheels includes spindles 55 each connected by a V-belt 57 to an electric motor 59. Each spindle is equipped with a felt, ring type wheel 61. The number of polishing spindles can also be varied in accordance with the requirements for the finished product.

FIG. 4 is an enlarged somewhat schematic view showing the relationship between a grinding wheel 51 and the face 63 of a sheet 11 of mirror stock. This figure also depicts the sequential steps of forming a bevel 16, cutting a strip 23 containing the bevel from the sheet 11, and then forming another bevel 16 along the edge where the cut 25 was made.

The sheet 11 and wheel 51 are offset at the designated angle from each other to form the bevel 16 on the face 63 along one edge of the sheet of mirror stock. In this example, the bevel is approximately 3 inches wide and the cut line 25 is located so that all of the bevel 16 is included in the strip 23 which is removed from the sheet 11. Under some circumstances, it may be desirable to make the bevel wider than the strip 23 or, in other words, the bevel may overlap the strip. This, of course, will be governed by requirements for the finished mirror.

Whereas, the preferred form of the invention has been described and shown, it should be understood that there are modifications, alterations and changes which may be made without departing from the teachings of the invention. Therefore, the scope of the invention should be only limited by the claims attached hereto.

I claim:

1. A method of manufacturing automotive day/night mirrors including the steps of:
    forming a bevel along one edge of a sheet of mirror stock with said bevel having a width at least equal to the desired width of the finished mirrors,
    cutting a strip containing at least a major portion of said bevel from said sheet of mirror stock, and
    cutting said mirrors from said beveled strip.

2. A method of claim 1 further characterized in that the previously described steps of forming a bevel along one edge of a sheet of mirror stock and then cutting a strip containing said bevel from said sheet of mirror stock are repeated until the entire usable portion of the sheet of mirror stock is cut into beveled strips.

3. A method of manufacturing mirrors for use in automotive day/night mirror assemblies including the steps of:
    forming a wide bevel on one edge of a sheet of mirror stock,
    said width of said bevel being at least equal to the desired width of said finished mirrors,
    cutting a strip containing at least a major portion of said bevel from said sheet of mirror stock,
    forming another and similar bevel along the edge of said sheet of mirror stock from which said strip was cut,
    cutting a strip containing at least a major portion of said bevel from said sheet of mirror stock and repeating said beveling and cutting steps until the usable portion of said mirror stock is cut into beveled strips, and
    forming said mirrors from said beveled strips of mirror stock.

4. The method of claim 1 further characterized in that said bevel is formed at an angle of approximately 3° relative to the face of said sheet of mirror stock.

5. A method of claim 1 further characterized in that said bevel is formed with a width of approximately 3 inches.

6. The method of claim 1 further characterized in that grinding, lapping and polishing wheels are used to form said bevel and said sheet of mirror stock is moved relative to said wheels during the bevel forming operations.

* * * * *